(12) United States Patent
Wu

(10) Patent No.: US 7,330,396 B2
(45) Date of Patent: Feb. 12, 2008

(54) FARFIELD ANALYSIS OF NOISE SOURCES

(75) Inventor: Sean F. Wu, Troy, MI (US)

(73) Assignee: Wayne State University, Detroit, MI (US)

( * ) Notice: Subject to any disclaimer, the term of this patent is extended or adjusted under 35 U.S.C. 154(b) by 533 days.

(21) Appl. No.: 10/964,393

(22) Filed: Oct. 13, 2004

(65) Prior Publication Data

US 2006/0080418 A1 Apr. 13, 2006

(51) Int. Cl.
*G06F 15/177* (2006.01)
(52) U.S. Cl. ............................................. 367/13
(58) Field of Classification Search ................. 367/13
See application file for complete search history.

(56) References Cited

U.S. PATENT DOCUMENTS

| 5,712,805 A | 1/1998 | Wang et al. | |
| 6,996,481 B2 * | 2/2006 | Wu | 367/129 |
| 2006/0080418 A1 * | 4/2006 | Wu | 709/220 |

FOREIGN PATENT DOCUMENTS

WO    WO 2006/044051 A2 * 8/2006

OTHER PUBLICATIONS

Search Report PCT/US2005/031852, May 8, 2006.

Hansen T B: "Spherical expansions of time-domain acoustic fields: application near-field scanning", Journal of the Acoustical Society of America USA, vol. 98, No. 2, Aug. 1995, pp. 1204-1215.

Isakov V et al: "On theory and application of the Helmholtz equation least squares method in inverse acoustics" Inverse Problems, Institute Of Physics Publishing, Bristol, GB, vol. 18, No. 4, (Aug. 2002), pp. 1147-1159.

Yu. A. Eremin, Complete Systems Of Functions For The Study Of Boundary Value Problems In Mathematical Physics, SAv. Phys. Dokl. 32 (8), Aug. 1987, pp. 635-637. 1988 American Institute of Physics, M.V. Lomonosav State University, Moscow.

* cited by examiner

*Primary Examiner*—Dan Pihulic
(74) *Attorney, Agent, or Firm*—Carlson, Gaskey & Olds

(57) ABSTRACT

An algorithm diagnoses the noise source strength distribution on an arbitrarily shaped object based on acoustic pressures measured in the far field, known as FANS. FANS enable one to acquire a quick estimate of the acoustic pressure at locations that are off limit to traditional measurement microphones. Generally, in the method of the present invention, the noise source is modeled in terms a plurality of virtual spherical wave sources distributed on an auxiliary surface conformal to a source boundary from the inside, but not on the source boundary itself. Sound is then measured at a plurality of measurement points external to the source boundary. The sound field is reconstructed on the source boundary surface itself.

17 Claims, 1 Drawing Sheet

FARFIELD ANALYSIS OF NOISE SOURCES

BACKGROUND OF THE INVENTION

The present invention provides a methodology for farfield analysis of noise sources (FANS) that represents a new concept for remote diagnostics of noise sources and for revealing the distribution of strengths of a sound source that is otherwise hard to obtain due either to limitations on the measurement devices or to inaccessibility of measurement transducers. For example, in analyzing the distribution of vehicle pass-by noise source or that of turbulence over a car body inside a wind tunnel, or the strength of a hot jet engine or that of wind turbine, it will be nearly impossible to place an array of microphones next to the source. This is because the presence of any measurement devices near a source may either completely alter the acoustic pressure field that is being measured such as in diagnosing sources of vehicle pass-by noise, or the condition and environment are so hostile that it can completely damage a transducer such as in the case of a hot jet engine, or the only way to measure the acoustic pressure is to do it in a far field such as in the case of a wind turbine.

Under these conditions, the well-known nearfield acoustic holography (NAH) is not an option, even though it is very accurate and can provide all the encompassing acoustic quantities generated by a sound source. It is emphasized that in these circumstances, it will not be possible to obtain precise measurements of an acoustic pressure field and only an estimate of the acoustic pressure can be made. Nevertheless, in practice such adversary situations are often encountered in which the acoustic pressure at the location where microphones cannot be placed is desired. There are other cases in which a quick estimate of the strength of a noise source is required and for which NAH may not be the method of choice because it is considered time consuming and costly. So it will be highly desirable to have a methodology that can provide a quick estimate of the strength of a noise source in a far field.

Presently, there are no reliable methods available for diagnosing source strengths on an arbitrary source surface based on the far-field acoustic pressure measurements. Microphone only provides the sound pressure level (SPL) value or spectrum at a measurement location. NAH can correlate the near-field acoustic pressure measurements to the acoustic field on a source surface. However, when measurements are taken in a far field, the near-field effects are lost and the ratio of a measurement aperture to the standoff distance is substantially reduced in comparison to that in near-field measurements. As a result, the input data are severely inadequate and the problem of reconstruction becomes so highly ill posed that the results thus obtained are meaningless even if regularization is utilized.

To address the need for far-field source identification, some rudimentary methods were proposed, including the beam forming technology developed by Acoustic Camera and Bruel and Kjær. Beam forming is a spatial filter that operates on the output of an array of sensors in order to enhance the amplitude of a coherent wavefront relative to background noise and directional interference. In applying beaming forming to noise source identification, the acoustic pressure is measured by an array of 30 to 60 microphones in the far field. The phases of these measured acoustic pressures are adjusted so that a maximum pressure lobe is identified. The orientation of this pressure lobe indicates where the sound wave is coming from.

The original beamforming makes use of a superposition of plane waves to localize sound source within an angular sector. Since the plane wave has constant amplitude, this approach can only tell the direction of sound wave propagation, but not the actual location of the source. An improved beamforming utilizes a superposition of spherical waves. The phase delay calculations of the spherical waves allow for focusing on a source location. However, the acoustic images are displayed on a plane parallel to the microphone array, so it is two dimensional. Moreover, there is no way of identifying the source strengths on the surface of an arbitrarily shaped object.

SUMMARY OF THE INVENTION

The proposed FANS algorithms are totally different from beamforming technique since it is developed for source diagnostics, but not for target identification. FANS aim at diagnosing the source strength distribution on an arbitrarily shaped object based on acoustic pressures measured in the far field. FANS enable one to acquire a quick estimate of the acoustic pressure at locations that are off limit to the traditional measurement microphones. Meanwhile, it requires much fewer measurements than NAH does.

Generally, in the method of the present invention, a plurality of virtual spherical wave sources are distributed on an auxiliary surface conformal to a source boundary from the inside but on the source boundary itself. Sound is then measured at a plurality of measurement points external to the source boundary. Based on the measured data, the sound field is reconstructed on the source boundary surface.

BRIEF DESCRIPTION OF THE DRAWINGS

The advantages of the present invention can be understood by reference to the following detailed description when considered in connection with the accompanying drawings wherein.

DETAILED DESCRIPTION OF A PREFERRED EMBODIMENT

Figure 1:
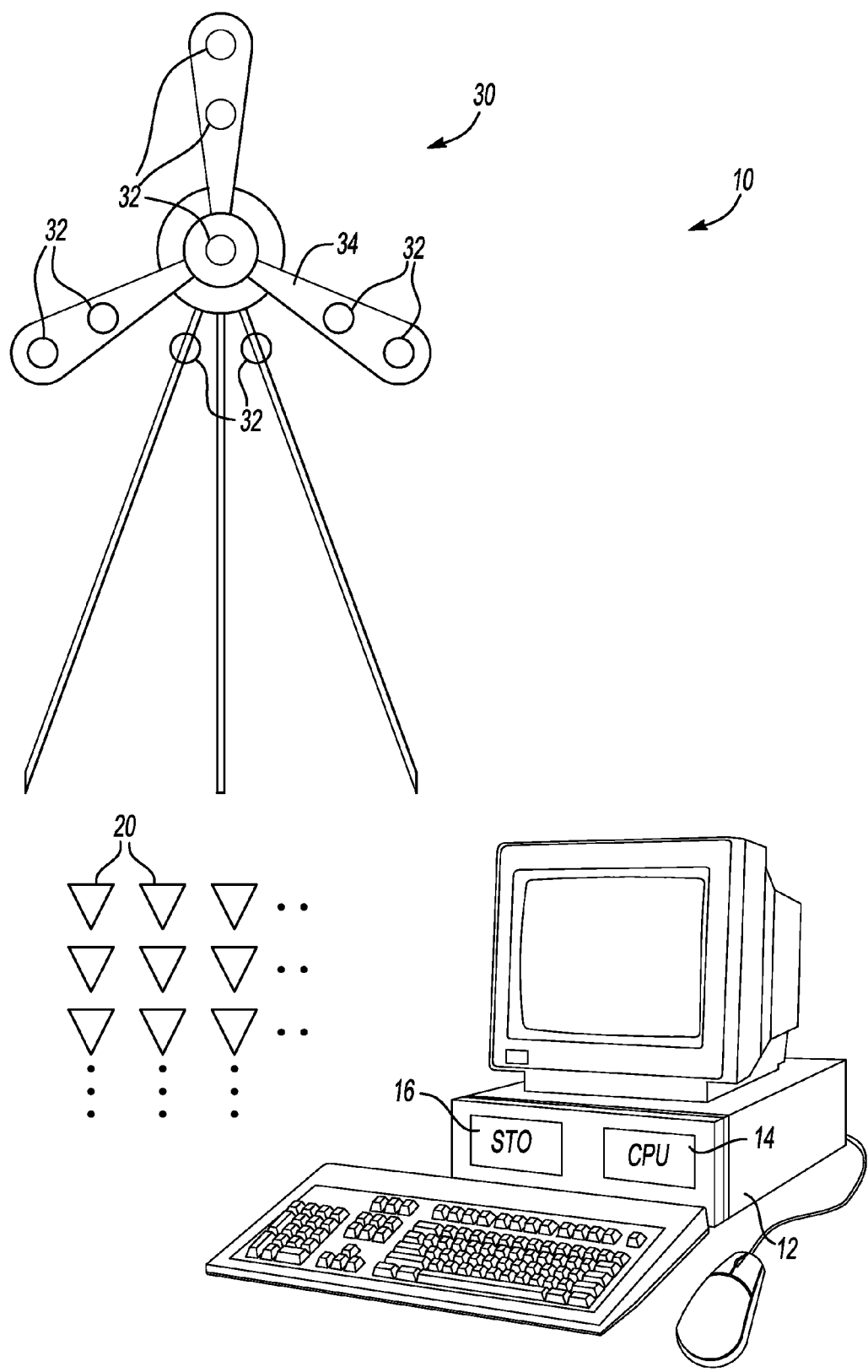
FIG. 1 schematically shows a system for diagnosing noise sources.

A noise diagnostic system 10 according to the present invention includes a computer 12 having a processor 14 and storage 16 including memory and mass storage, such as magnetic, electronic and/or optical storage. A plurality of transducers 20, such as microphones, measure sound pressure and send signals to the computer 12 indicating the sound pressure at the location of the transducers 20.

The noise diagnostic system 10 of the present invention uses a novel algorithm, described below as the "FANS algorithm," to diagnose noise from a target source 30 whose dimensions, geometry and location are generally known but not necessarily precisely. The algorithm is stored in storage 16 and executed by the processor 14 in the computer 12. In the method according to the invention, a plurality of virtual noise sources 32 are defined on a surface 34 of the target source 30. In the noise diagnostic system 10, the virtual noise sources 32 are spherical wave sources.

FANS algorithms are based on a superposition of distributed spherical wave (DSW) that satisfies the Helmholtz equation and Sommerfeld radiation condition in a free field:

$$\nabla^2 \hat{p} + k^2 \hat{p} = 0, \tag{1}$$

$$\lim_{r \to \infty} r \left( \frac{\partial}{\partial r} - ik \right) \hat{p} = 0, \tag{2}$$

where $\hat{p}$ is the complex amplitude of the acoustic pressure, $k=\omega/c$ is an acoustic wave number with $\omega$ being the angular frequency and c being the speed of sound of the fluid medium, i is the imaginary unit, and $r=|x|$ with x being any point in a free field.

FANS algorithms seek to approximate the acoustic pressure $\hat{p}$ at any location in terms of an expansion of lower-order spherical wave functions with respect to a finite number of virtual sources 32 distributed on a surface conformal to the target source surface 34 from the inside, $$\hat{p} = (x; \omega) = \sum_{n=1}^{N} \{ C_n h_0^{(1)}(kr_n) + h_1^{(1)}(kr_n)[D_n Y_1^0(\theta_n, \phi_n) + E_n Y_1^{-1}(\theta_n, \phi_n) + F_n Y_1^1(\theta_n, \phi_n)] \}, \tag{3}$$

where $h_0^{(1)}(kr_n)$ and $h_1^{(1)}(kr_n)$ are the first kind of the spherical Hankel functions of order 0 and 1, respectively, and $Y_1^0(\theta_n,\phi_n)$, $Y_1^{-1}(\theta_n,\phi_n)$ and $Y_1^1(\theta_n,\phi_n)$ are the spherical harmonics are given by $$h_0^{(1)}(kr_n) = -\frac{ie^{ikr_n}}{kr_n}, \tag{4a}$$

$$h_0^{(1)}(kr_n) = -\frac{e^{ikr_n}(i+kr_n)}{(kr_n)^2}, \tag{4b}$$

$$Y_1^0(\theta_n, \phi_n) = \frac{1}{\sqrt{4\pi}} \cos\theta, \tag{4c}$$

$$Y_1^{-1}(\theta_n, \phi_n) = e^{i\phi_n} \sqrt{\frac{3}{8\pi}} \sin\theta_n, \tag{4d}$$

$$Y_1^1(\theta_n, \phi_n) = -e^{i\phi_n} \sqrt{\frac{3}{8\pi}} \sin\theta_n, \tag{4e}$$

and $(r_n, \theta_n, \phi_n)$ represent the local spherical coordinates with respect to the n th discrete virtual source at $X_n^S$, n=1 to N, which is defined as $x_n \equiv (r_n, \theta_n, \phi_n) = x - x_n^S$. These virtual sources can be either distributed on an auxiliary surface conformal to the boundary of D or along an axis of symmetry of D. Note that the expansion functions in (3) satisfy the Helmholtz equation (1) and Sommerfeld radiation condition (2).

Let the expansion (3) be complete in $L^2(\Gamma)$, where $\Gamma$ is the surface on which the acoustic pressures are specified. In other words, for any pressure p in $L^2(\Gamma)$ and any $\epsilon>0$, there are an $N=N(\epsilon)$ and a set of coefficients $\{C_n\}_{n=1}^N$, $\{D_n\}_{n=1}^N$, $\{E_n\}_{n=1}^N$ and $\{F_n\}_{n=1}^N$ such that $$\int_\Gamma \left| p - \sum_{n=1}^N \{ C_n h_0^{(1)}(kr_n) + h_1^{(1)}(kr_n)[D_n Y_1^0(\theta_n, \phi_n) + E_n Y_1^{-1}(\theta_n, \phi_n) + F_n Y_1^1(\theta_n, \phi_n)] \} \right|^2 d\sigma < \varepsilon^2, \tag{5}$$

where $d\sigma$ denotes a surface element. Further, we require the expansion functions to be linearly independent in $L^2(\Gamma)$. The completeness of the expansion functions assures that any solution to the Helmholtz equation can be approximated in the mean squares sense on $\Gamma$ by a superposition of an expansion, and its linear independence guarantees that the resultant matrix has a full rank. The unknown coefficients $C = \{ \ldots, C_n, D_n, E_n, F_n, \ldots \}^T$ in Eq. (3) are obtained by minimizing the least-square error between approximated solution $\hat{p}$ and acoustic pressure $\hat{p}_\Gamma$ measured on $\Gamma$ $$C = \arg\min \int_\Gamma |\hat{p} - \hat{p}_\Gamma|^2 d\sigma. \tag{6}$$

Equation (6) can be rewritten in a matrix form as $$C = \arg\min \| W_\Gamma (\Phi_\Gamma \xi - \hat{p}_\Gamma) \|_2^2, \tag{7}$$

where $\Phi_\Gamma$ is a matrix containing $h_0^{(1)}(kr_n)$, $h_1^{(1)}(kr_n)$, $Y_1^0(\theta_n,\phi_n)$, $Y_1^{-1}(\theta_n,\phi_n)$, and $Y_1^1(\theta_n,\phi_n)$, $$\Phi_\Gamma = \begin{bmatrix} \cdots & \cdots & \cdots & \cdots \\ \cdots & h_0^{(1)}(kr_n) & h_1^{(1)}(kr_n)Y_1^0(\theta_n,\phi_n) & h_1^{(1)}(kr_n)Y_1^{-1}(\theta_n,\phi_n) & h_1^{(1)}(kr_n)Y_1^1(\theta_n,\phi_n) & \cdots \\ \cdots & \cdots & \cdots & \cdots \end{bmatrix}_{M \times 4N}, \tag{8a}$$

$$C = \{ \cdots, C_n, D_n, E_n, F_n, \cdots \}^T_{4N \times 1}, \tag{8b}$$

$$\hat{p}_\Gamma = \{ \cdots, \hat{p}(x_m, \omega)_n, \cdots \}^T_{M \times 1}, \tag{8c}$$

where $x_m$, m=1 to M, represents points on the measurement surface $\Gamma$, M is the number of measurements taken on $\Gamma$ (M≧4N), and $W_\Gamma$ is an M×M non-singular diagonal weight matrix whose elements are determined by the quadrature formula and the mesh on $\Gamma$.

Since in this case, the measured data are incomplete and inaccurate, the resultant matrix may be ill conditioned. To ensure a convergent solution, we use Tikhonov regularization (TR) to write the coefficients C as a minimum smoothing functional $$C = \operatorname{argmin}\left\{\int_\Gamma |\hat{p}_\Gamma - \hat{p}_S|^2 d\sigma + \lambda^2 \int_S [|\hat{p}_S|^2 + |\partial \hat{p}_S/\partial v|^2] d\sigma\right\}., \tag{9}$$

where v indicates the unit normal direction, $\lambda > 0$ is a regularization parameter, and its integral multiplier represents a penalty imposed on both the reconstructed acoustic pressure and normal velocity, namely, the energy norm of the solution.

It has been shown that imposing a penalty on the reconstructed acoustic pressure alone leads to a severe oversmoothing, that on the reconstructed normal surface velocity alone tends to be less oversmoothing, but that on both of these quantities yields an optimal reconstruction.

A discrete version of (9) can be written in the following form $$C = \operatorname{argmin}\left\{\|W_\Gamma(\Phi_\Gamma \xi - \hat{p}_\Gamma)\|_2^2 + \lambda^2 \left\|W_S\begin{bmatrix}\Phi_S\\\Psi_S\end{bmatrix}\xi\right\|_2^2\right\}, \tag{10}$$

where $W_S$ denotes a H×H non-singular diagonal weight matrix whose elements depend on the quadrature formula and the mesh on the target source surface S, and $\Psi_S$ is the normal derivative of $\Phi_S$, which is given by $[\Psi_S]_{\hbar m} = \partial_\nu \Phi_m(x_\hbar^S;\omega_\hbar=1$ to H and m=1 to M, and $x_\hbar^S$ represent the points on the target surface S, Alternatively, we can simplify expansion (3) to contain $h_0^{(1)}(kr_n)$, $h_1^{(1)}(kr_n)$, and $Y_1^0(\theta_n,\phi_n)$. This is equivalent to expressing the acoustic pressure in terms of superposition of monopoles and normal component of dipoles, an approximation of the Helmholtz integral theory.

$$\hat{p}(x;\omega) = \sum_{n=1}^N [C_n h_0^{(1)}(kr_n) + D_n h_1^{(1)}(kr_n) Y_1^0(\theta_n,\phi_n)], \tag{11}$$

where $C_n$ and $D_n$ can be solved by minimizing the least-square errors between an approximated solution $\hat{p}$ and the acoustic pressure $\hat{p}_\Gamma$ measured on $\Gamma$, which is expressible in a matrix form of Eq. (7), where $\Phi_\Gamma$ is a matrix containing $h_0^{(1)}(kr_n)$, $h_1^{(1)}(kr_n)$, and $Y_1^0(\theta_n,\phi_n)$ only, $$\Phi_\Gamma = \begin{bmatrix} \cdots & & \cdots \\ \cdots & h_0^{(1)}(kr_n) & h_1^{(1)}(kr_n) Y_1^0(\theta_n,\phi_n) & \cdots \\ & \cdots & \end{bmatrix}_{M\times 2N}, \tag{12a}$$

$$C = \{\cdots, C_n, D_n, \cdots\}_{2N\times 1}^T. \tag{12b}$$

The advantage of this alternative approach is obvious. Using the same number of measurement points M, we can now deploy twice as many virtual sources as before. This may enhance spatial resolution of the reconstructed acoustic images on a source surface.

Since in the case the problem is mathematically ill posed, we must regularize the matrix equation (10), for example, using TR to obtain a bounded solution. For simplicity, we implement TR through the filter factors and generalized singular value decomposition (GSVD) of a matrix pair (A,L), where $A = W_\Gamma \Phi_\Gamma$ and $$L = W_S \begin{bmatrix}\Phi_S\\\Psi_S\end{bmatrix}.$$

The filter factors $f_j$ are expressed in terms of the generalized singular values $\gamma_j$ $$f_j^{TR} = \frac{\gamma_j^2}{\gamma_j^2 + \lambda^2}, j = 1 \text{ to } J. \tag{13}$$

Since the penalty matrix $$L = W_S \begin{bmatrix}\Phi_S\\\Psi_S\end{bmatrix}$$

has more rows than columns with a full column rank, we can use a QR-factorization first for $L=Q_L R_L$, and then calculate GSVD of the matrix pair (A,L), instead of calculating GSVD of (A,L) directly.

The regularization parameter $\lambda$ in (10) can be obtained by generalized cross validation (GCV), which minimizes the GCV function $$G(\lambda) = \frac{\|A\xi_\lambda - \hat{p}_\Gamma\|_2^2}{\operatorname{trace}(I_M - AA^\#)^2}, \tag{14}$$

where $A^\#$ denotes a regularized pseudo-inverse of A that produces $\xi_\lambda$ and $I_M$ represents an M×M identity matrix.

Once the coefficients C are determined, we can reconstruct acoustic pressures anywhere in the field, including the source surface S using Eq. (3).

PROCEDURES

The procedures in FANS algorithms are as follows.

Specify the geometry and dimensions of a target source and frequency range in which the acoustic pressure distribution is desired.

Place an array of microphones 20 in any configuration at any distances appropriate for measuring the acoustic pressure signals produced by the target source 30.

Distribute a finite number of virtual sources 32 on an auxiliary surface 34 conformal to the source boundary from the inside.

Take at least M measurements of the acoustic pressure, where M≧4N if Eq. (3) is used or M≧2N if Eq. (11) is used.

Solve Eq. (10) for the expansion coefficients C.

Substitute C into (3) to estimate the acoustic pressure anywhere including the source surface.

The advantages of FANS are that: 1) formulation (3) is uniquely suited for handling far-field diagnostics and the loss of the near-field effects is no longer an issue; 2) the measurements required by FANS are much fewer than those by NAH so the diagnostics can be very efficient; 3) FANS algorithms make it possible to analyze the distribution of source strength on an arbitrarily shaped surface; 4) measurement setup is extremely simple; and 5) diagnostics is highly flexible and portable.

The major functions of FANS are to: 1) conduct far-field analysis of a noise source such as wind turbine and vehicle pass-by noise; 2) estimate the propagating component of the source strength based on acoustic pressure measurements at a large distance such as a hot jet engine; and 3) estimate the corresponding acoustic power spectrum of a source.

FANS algorithms are also valid in the near field, just like a typical NAH algorithm. So FANS can be a viable diagnostic tool for conducting noise sources and their transmission paths, and for producing a quick analysis of the predominant noise sources of a large structure whose SPL values can only be measured from large distances or a source whose surrounding environment is so hostile that it can damage measurement devices placed close to it, or turbulence generated sound that is off limit to any intrusive measurement sensor. There are other applications such as vehicle wind tunnel tests and vehicle tire noise in which FANS can become an invaluable diagnostic tool for the practicing engineers.

The major disadvantages of FANS are that its results may be limited to the propagating component of the acoustic pressure and corresponding acoustic power spectrum. Since the phase information is not attainable in FANS, there is no way of knowing other acoustic quantities such as the particle velocity and acoustic intensity. Also, since no reference microphones can be used, there is no way of distinguishing contributions from each individual incoherent source, so the SPL values provided by FANS represent the combined effect of all individual sources.

These are the major trade offs between NAH and FANS. The former enables one to get a complete description of the characteristics of a sound source, but requires many measurements taken at very close range to the source. While the latter allows for quick estimates of the strength of a sound source whose location is off limit to traditional measurement microphones, but the information it provides is very limited. Even so, FANS can still become an invaluable diagnostic tool because it offers something that is not attainable by NAH. In short, FANS and NAH serve different purposes, they are non-interchangeable, and both are useful in their own right.

EXAMPLES

To examine the validity of FANS algorithms, we conducted experiments on identifying sound sources of a JBL® speaker that consisted of a woofer, mid-ranger, and tweeter. This speaker system was driven by an HP 8904A Multi-Function Synthesizer DC-600 kHz and McIntosh MC352 Power Amplifier to produce white noise inside a fully anechoic chamber in the Acoustics, Vibration, and Noise Control Laboratory at Wayne State University. The acoustic pressures were measured by an array of 48 PCB T130D21 Free-field microphones that were laid on the floor at 2.4 m away. The measured data were transferred to a personal computer through the Larson Davis Digital Sensor System Model 100 for analog to digital conversion, and taken as input to Eq. (3) to diagnose the locations of sources that are responsible for radiating the acoustic pressures. All data acquisition and post processing were controlled by the computer.

In general, a woofer, mid-ranger, and tweeter are designed to produce low-frequency, mid-frequency, and high-frequency sounds, respectively. The two holes are used to balance the sounds generated by these speakers. Results show that at very low frequencies, sounds are indeed from the woofer. As frequency increases, sounds are coming out from the mid-ranger and tweeter as well as the balance holes.

The second example involves using Eq. (11) to visualize sound radiation from an airplane propeller blade. In this case, we deployed sixty microphones 20 that were laid on the ground in order to eliminate the effect of reflection of the acoustic pressure from the ground, and uniformly distributed twenty virtual sources 32 on the surfaces of the blade and the engine. The engine was run at an idle speed of 1440 rpm and the acoustic pressure signals thus measured were taken as input to Eq. (11) to determine the expansion coefficients C. Once this was done, the acoustic pressure distributions were visualized.

At the blade passage frequency and its harmonics, it was observed that sound was generated primarily by the fluctuating forces of the rotating blades exerted on the air. This was consistent with the fact that the engine was running at an idle speed. Also, source strengths seemed to be converged to three segments along the blade chord at higher frequencies, indicating that the blades were vibrating at their own modes at higher frequencies.

CONCLUSION

New algorithms known as FANS are developed to visualize the acoustic sources based on the acoustic pressures measured in the field. These FANS algorithms are valid in both near-and far-fields and can be used to diagnose noise source based on the acoustic pressure measurements taken at either very close or very far ranges. If the measurements are taken in the near field, they behave just like conventional NAH that can provide all acoustic quantities at very high accuracy. If measurements are taken at large distances, the propagating component of the acoustic pressure is reconstructed. The information thus obtained allows one to identify the noise source locations. The number of measurement points required in the far-field analysis is much less than that in the near-field analysis. Since FANS can work under a variety of conditions that are off limit to NAH and since in engineering applications a quick snap shot rather than a detailed analysis of acoustic source is often desired, they can potentially be a very powerful noise diagnostic tool.

In accordance with the provisions of the patent statutes and jurisprudence, exemplary configurations described above are considered to represent a preferred embodiment of the invention. However, it should be noted that the invention could be practiced other than as specifically illustrated and described without departing from its spirit or scope.

What is claimed is:

1. A method for diagnosing a noise source including the steps of:
   a) modeling the noise source strength in terms of a distribution of plurality of virtual spherical wave sources conformal to a source boundary from the inside, but not on the source boundary;
   b) measuring sound at a plurality of points external to the source boundary; and c) reconstructing sound field on the source boundary surface other than the plurality of points based upon said steps a) and b).

2. The method of claim 1 wherein said step c) further includes the step of reconstructing sound at the plurality of virtual sources.

3. The method of claim 1 further including the step of distributing the plurality of virtual spherical wave sources on an auxiliary surface conformal to a boundary of the source.

4. The method of claim 1 wherein the number of the plurality of points is approximately four times the number of virtual spherical wave sources.

5. The method of claim 1 wherein the reconstructed sound is given by:

$$\hat{p}(x;\omega) = \sum_{n=1}^{N} \{C_n h_0^{(1)}(kr_n) + h_1^{(1)}(kr_n)[D_n Y_1^0(\theta_n,\phi_n) + E_n Y_1^{-1}(\theta_n,\phi_n) + F_n Y_1^1(\theta_n,\phi_n)]\},$$

where $h_0^{(1)}(kr_n)$ and $h_1^{(1)}(kr_n)$ are the first kind of the spherical Hankel functions of order 0 and 1, respectively, and $Y_1^0(\theta_n,\phi_n)$, $Y_1^{-1}(\theta_n,\phi_n)$ and $Y_1^1(\theta_n,\phi_n)$, are the spherical harmonics.

6. The method of claim 1 wherein the expansion coefficients are obtained by $$C = \operatorname{argmin}\left\{\|W_\Gamma(\Phi_\Gamma \xi - \hat{p}_\Gamma)\|_2^2 + \lambda^2 \left\|W_S \begin{bmatrix}\Phi_S \\ \Psi_S\end{bmatrix}\xi\right\|_2^2\right\}, \quad (10)$$

where $W_S$ denotes a H×H non-singular diagonal weight matrix whose elements depend on the quadrature formula and the mesh on the target source surface S, $\Psi_S$ is the normal derivative of $\Phi_S$, which is given by $[\Psi_S]_{\hbar m}=\partial_\nu \Phi_m(x_\hbar^S;\omega)$, $\hbar$=1 to H and m=1 to M, and $x_\hbar^S$ represent the points on the target surface S, and $\Phi_\Gamma$ is given by $$\Phi_\Gamma = \begin{bmatrix} \cdots & \cdots & \cdots & \cdots & \cdots \\ \cdots & h_0^{(1)}(kr_n) & h_1^{(1)}(kr_n)Y_1^0(\theta_n,\phi_n) & h_1^{(1)}(kr_n)Y_1^{-1}(\theta_n,\phi_n) & h_1^{(1)}(kr_n)Y_1^1(\theta_n,\phi_n) & \cdots \\ \cdots & \cdots & \cdots & \cdots & \cdots \end{bmatrix}_{M\times 4N}.$$

7. The method of claim 1 wherein the number of the plurality of points is approximately two times the number of virtual spherical wave sources.

8. The method of claim 1 wherein the reconstructed sound can alternatively be determined by:

$$\hat{p}(x;\omega) = \sum_{n=1}^{N} [C_n h_0^{(1)}(kr_n) + D_n h_1^{(1)}(kr_n)Y_1^0(\theta_n,\phi_n)],$$

9. The method of claim 1 wherein the expansion coefficients are obtained by $$C = \operatorname{argmin}\left\{\|W_\Gamma(\Phi_\Gamma \xi - \hat{p}_\Gamma)\|_2^2 + \lambda^2 \left\|W_S \begin{bmatrix}\Phi_S \\ \Psi_S\end{bmatrix}\xi\right\|_2^2\right\}, \quad (10)$$

where $W_S$ denotes a H×H non-singular diagonal weight matrix whose elements depend on the quadrature formula and the mesh on the target source surface S, $\Psi_S$ is the normal derivative of $\Phi_S$, which is given by $[\Psi_S]_{\hbar m}=\partial_\nu \Phi_m(x_\hbar^S;\omega)$, $\hbar$=1 to H and m=1 to M, and $x_\hbar^S$ represent the points on the target surface S, and $\Phi_\Gamma$ is given by $$\Phi_\Gamma = \begin{bmatrix} & \cdots & & \\ \cdots & h_0^{(1)}(kr_n) & h_1^{(1)}(kr_n)Y_1^0(\theta_n,\phi_n) & \cdots \\ & \cdots & & \end{bmatrix}_{M\times 2N}.$$

10. A system for diagnosing a noise source comprising:
a plurality of virtual spherical wave noise sources;
a plurality of transducers for measuring sound at a plurality of measurement points; and
a computer diagnosing the noise source based upon the sound measured at the plurality of measurement points and the based upon the virtual spherical wave noise sources.

11. The system of claim 10 wherein the plurality of virtual spherical wave sources are distributed on an auxiliary surface conformal to a boundary of the noise source.

12. The system of claim 10 wherein the computer reconstructs sound at a plurality of points other than the plurality of measurement points.

13. The system of claim 10 wherein the computer reconstructs sound at the plurality of virtual spherical wave noise sources.

14. The system of claim 10 wherein the number of the plurality of measurement points is approximately four times the number of virtual spherical wave sources.

15. The system of claim 10 wherein the number of the plurality of measurement points is approximately two times the number of virtual spherical wave sources.

16. The system of claim 10 wherein the reconstructed sound is given by:

$$\hat{p}(x;\omega) = \sum_{n=1}^{N} \{C_n h_0^{(1)}(kr_n) + h_1^{(1)}(kr_n)[D_n Y_1^0(\theta_n,\phi_n) + E_n Y_1^{-1}(\theta_n,\phi_n) + F_n Y_1^1(\theta_n,\phi_n)]\},$$

where $h_0^{(1)}(kr_n)$ and $h_1^{(1)}(kr_n)$ are the first kind of the spherical Hankel functions of order 0 and 1, respectively, $Y_1^0(\theta_n,\phi_n)$, $Y_1^{-1}(\theta_n,\phi_n)$ and $Y_1^1(\theta_n,\phi_n)$, are the spherical harmonics, and $$\Phi_\Gamma = \begin{bmatrix} \cdots & \cdots & \cdots & \cdots \\ \cdots & h_0^{(1)}(kr_n) & h_1^{(1)}(kr_n)Y_1^0(\theta_n,\phi_n) & h_1^{(1)}(kr_n)Y_1^{-1}(\theta_n,\phi_n) & h_1^{(1)}(kr_n)Y_1^1(\theta_n,\phi_n) & \cdots \\ \cdots & \cdots & \cdots & \cdots \end{bmatrix}_{M \times 4N}.$$

17. The system of claim 10 wherein the reconstructed sound is determined by:

$$\hat{p}(x;\omega) = \sum_{n=1}^{N} [C_n h_0^{(1)}(kr_n) + D_n h_1^{(1)}(kr_n) Y_1^0(\theta_n,\phi_n)],$$

where $C_n$ and $D_n$ is solved by minimizing the least-square errors between an approximated solution $\hat{p}$ and the acoustic pressure $\hat{p}_\Gamma$ measured on $\Gamma$, where $\Phi_\Gamma$ is a matrix containing $h_0^{(1)}(kr_n)$, $h_1^{(1)}(kr_n)$ and $Y_1^0(\theta_n,\phi_n)$ only, $$\Phi_\Gamma = \begin{bmatrix} \cdots \\ \cdots & h_0^{(1)}(kr_n) & h_1^{(1)}(kr_n)Y_1^0(\theta_n,\phi_n) & \cdots \\ \cdots \end{bmatrix}_{M \times 2N}.$$

* * * * *